United States Patent
Hamada et al.

(10) Patent No.: US 11,764,377 B2
(45) Date of Patent: Sep. 19, 2023

(54) FUEL CELL SYSTEM

(71) Applicant: TOYOTA JIDOSHA KABUSHIKI KAISHA, Aichi-ken (JP)

(72) Inventors: Shigetaka Hamada, Nisshin (JP); Fumihisa Ishiguro, Nagoya (JP); Kiyoshi Yoshinaga, Okazaki (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/838,267

(22) Filed: Jun. 13, 2022

(65) Prior Publication Data
US 2023/0012347 A1 Jan. 12, 2023

(30) Foreign Application Priority Data
Jul. 6, 2021 (JP) ................... 2021-111979

(51) Int. Cl.
*H01M 8/04828* (2016.01)
*H01M 50/30* (2021.01)
*H01M 8/04119* (2016.01)
*H01M 8/04492* (2016.01)

(52) U.S. Cl.
CPC ... *H01M 8/04828* (2013.01); *H01M 8/04126* (2013.01); *H01M 8/04522* (2013.01); *H01M 50/394* (2021.01)

(58) Field of Classification Search
CPC ......... H01M 8/04828; H01M 8/04126; H01M 8/04522
See application file for complete search history.

(56) References Cited

U.S. PATENT DOCUMENTS

| | | | |
|---|---|---|---|
| 2006/0169024 A1* | 8/2006 | Shoji | H01M 8/0447 73/23.2 |
| 2014/0193728 A1* | 7/2014 | Schaevitz | H01M 8/04753 429/444 |
| 2018/0294491 A1* | 10/2018 | Ito | H01M 8/04141 |
| 2020/0144637 A1* | 5/2020 | Wagner | H01M 8/04305 |

FOREIGN PATENT DOCUMENTS

| | | |
|---|---|---|
| JP | 2008108538 A | 5/2008 |
| JP | 201841630 A | 3/2018 |
| JP | 2019121578 A | 7/2019 |

* cited by examiner

*Primary Examiner* — Stewart A Fraser
(74) *Attorney, Agent, or Firm* — HAUPTMAN HAM, LLP (57) ABSTRACT

A fuel cell system mounted on a vehicle includes a fuel cell, a humidity sensor configured to detect a humidity in a vehicle cabin of the vehicle, a cathode off-gas exhaust passage through which cathode off-gas emitted from the fuel cell is exhausted to outside the vehicle, an introducing port for cathode off-gas, provided in the cathode off-gas exhaust passage, a cathode off-gas introducing unit configured to introduce cathode off-gas emitted from the fuel cell, into the vehicle cabin of the vehicle via the introducing port, and a cathode off-gas introducing amount control unit configured to control an amount of the cathode off-gas introduced into the vehicle cabin of the vehicle in accordance with a humidity in the vehicle cabin of the vehicle, detected by the humidity sensor.

6 Claims, 6 Drawing Sheets

FUEL CELL SYSTEM

CROSS-REFERENCE TO RELATED APPLICATION

This application claims priority to Japanese Patent Application No. 2021-111979 filed on Jul. 6, 2021, incorporated herein by reference in its entirety.

BACKGROUND

1. Technical Field

The disclosure relates to a fuel cell system.

2. Description of Related Art

There is known a fuel cell system that provides heating in a vehicle cabin of a vehicle by introducing cathode off-gas emitted from a fuel cell into the vehicle cabin (see, for example, Japanese Unexamined Patent Application Publication No. 2008-108538 (JP 2008-108538 A)).

In contrast, the inventors have studied to control the humidity in a vehicle cabin of a vehicle equipped with a fuel cell.

SUMMARY

However, JP 2008-108538 A has not studied at all to control the humidity in the vehicle cabin of the vehicle equipped with the fuel cell.

The disclosure provides a fuel cell system capable of controlling the humidity in a vehicle cabin of a vehicle equipped with a fuel cell.

An aspect of the disclosure provides a fuel cell system mounted on a vehicle. The fuel cell system includes a fuel cell, a humidity sensor configured to detect a humidity in a vehicle cabin of the vehicle, a cathode off-gas exhaust passage through which cathode off-gas emitted from the fuel cell is exhausted to outside the vehicle, an introducing port for cathode off-gas, provided in the cathode off-gas exhaust passage, a cathode off-gas introducing unit configured to introduce cathode off-gas emitted from the fuel cell, into the vehicle cabin of the vehicle via the introducing port, and a cathode off-gas introducing amount control unit configured to control an amount of the cathode off-gas introduced into the vehicle cabin of the vehicle in accordance with a humidity in the vehicle cabin of the vehicle, detected by the humidity sensor.

With this configuration, it is possible to control the humidity in the vehicle cabin of the vehicle equipped with the fuel cell.

This is because the cathode off-gas introducing amount control unit configured to control the amount of cathode off-gas introduced into the vehicle cabin of the vehicle in accordance with a humidity in the vehicle cabin of the vehicle, detected by the humidity sensor, is provided.

The fuel cell system may further include a humidity control unit configured to control a humidity of the cathode off-gas introduced into the vehicle cabin of the vehicle in accordance with a humidity in the vehicle cabin of the vehicle, detected by the humidity sensor.

The fuel cell system may further include an oxygen concentration sensor configured to detect an oxygen concentration in the vehicle cabin of the vehicle, and an oxidant gas amount adjustment unit configured to, in accordance with an oxygen concentration in the vehicle cabin of the vehicle, detected by the oxygen concentration sensor, adjust an amount of oxidant gas to be flowed through a bypass passage that connects the cathode off-gas exhaust passage with an oxidant gas supply passage through which oxidant gas is supplied to the fuel cell.

A plurality of the introducing ports may be provided, and the humidity control unit may be configured to change the introducing port based on a condition of a humidity or a temperature in the vehicle cabin of the vehicle.

According to the aspect of the disclosure, it is possible to provide a fuel cell system capable of controlling a humidity in a vehicle cabin of a vehicle equipped with a fuel cell.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a fuel cell system 1 according to an embodiment of the disclosure will be described with reference to the accompanying drawings. Like reference numerals denote corresponding components in the drawings, and the description will not be repeated.

Initially, a configuration example of the fuel cell system 1 according to the embodiment will be described with reference to FIG. 1.

Figure 1:
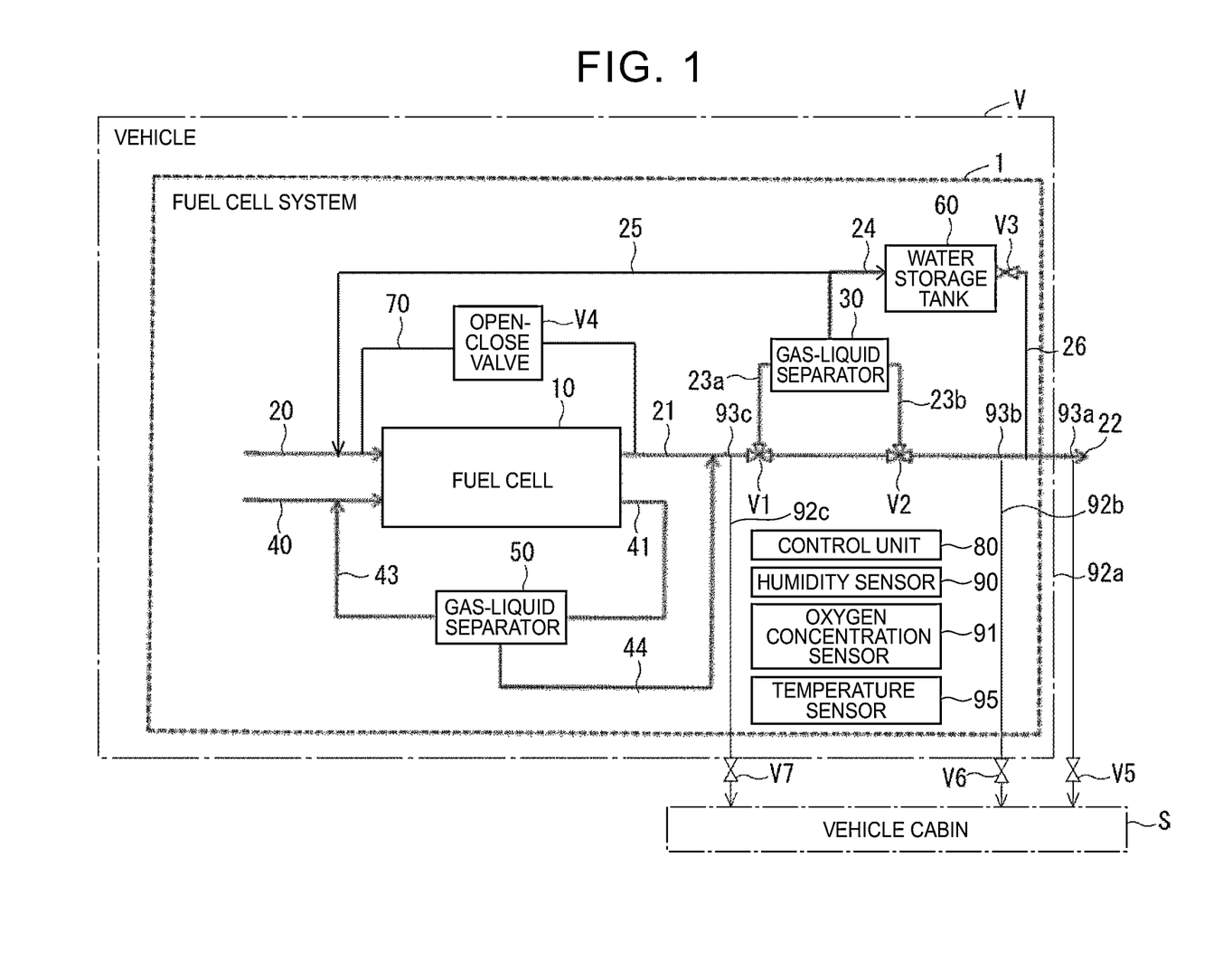
FIG. 1 is a system configuration diagram of a fuel cell system 1.

FIG. 1 is a system configuration diagram of the fuel cell system 1.

As shown in FIG. 1, the fuel cell system 1 is a system mounted on a vehicle V. The fuel cell system 1 includes a fuel cell 10, an oxidant gas supply passage 20, a cathode off-gas exhaust passage 21, a gas-liquid separator 30, a fuel gas supply passage 40, an anode off-gas exhaust passage 41, a gas-liquid separator 50, a water storage tank 60, a drain passage 26, a bypass passage 70, a control unit 80, a humidity sensor 90, an oxygen concentration sensor 91, cathode off-gas introducing passages 92 (92a, 92b, 92c), and the like.

The vehicle V is, for example, a food truck or an office car. A food truck means, for example, a vehicle on which appliances used in a kitchen (for example, cookware) are mounted. An office car means, for example, a vehicle on which appliances used in an office (for example, a display) are mounted. A type of the vehicle V is, for example, a minivan or a camper.

The fuel cell 10 is, for example, a polymer electrolyte fuel cell. The fuel cell 10 includes a stack that is one unit of a plurality of stacked single cells that generate electric power by an electrochemical reaction between oxidant gas (air or oxygen) supplied by a compressor (not shown) through the oxidant gas supply passage 20 and fuel gas (hydrogen) supplied through the fuel gas supply passage 40. For example, the fuel cell described in Japanese Unexamined Patent Application Publication No. 2018-041630 (JP 2018-041630 A) or Japanese Unexamined Patent Application Publication No. 2019-121578 (JP 2019-121578 A) may be used as the fuel cell 10. Although not shown in the drawing, electric power generated by the fuel cell 10 (stack) is supplied to a drive motor of the vehicle V, various auxiliaries mounted on the vehicle V, and receptacles provided in a vehicle cabin S. The receptacles are fittings, to which plugs of electrical appliances (for example, a refrigerator-freezer, a water server, an electric rice cooker, an electric pot, a television, a personal computer, and a charger) is inserted, to obtain electric power (alternating-current power). The receptacles are also called outlets or sockets.

The oxidant gas supply passage 20 is a duct that connects (communicates) the compressor (not shown) with the fuel cell 10. Oxidant gas (air or oxygen) supplied from the compressor (not shown) is supplied to the fuel cell 10 through the oxidant gas supply passage 20.

The cathode off-gas exhaust passage 21 is a duct that connects (communicates) the fuel cell 10 with an exhaust port 22. A three-way valve V1 is provided in the cathode off-gas exhaust passage 21 on the side adjacent to the fuel cell 10, and a three-way valve V2 is provided in the cathode off-gas exhaust passage 21 on the side adjacent to the exhaust port 22. The open-closed state of each of the three-way valves V1, V2 is controlled by the control unit 80. Cathode off-gas emitted from the fuel cell 10 is exhausted to outside the vehicle V via the exhaust port 22 through the cathode off-gas exhaust passage 21 in accordance with the open-closed state of each of the three-way valves V1, V2. Cathode off-gas emitted from the fuel cell 10 is supplied to the gas-liquid separator 30 through a connection passage 23a in accordance with the open-closed state of the three-way valve V1. The connection passage 23a connects (communicates) the cathode off-gas exhaust passage 21 (three-way valve V1) with the gas-liquid separator 30.

The gas-liquid separator 30 separates oxidant gas and produced water, included in cathode off-gas supplied through the connection passage 23a. The separated oxidant gas is exhausted to outside the vehicle V via the exhaust port 22 through a connection passage 23b and the cathode off-gas exhaust passage 21 in accordance with the open-closed state of the three-way valve V2. The connection passage 23b connects (communicates) the gas-liquid separator 30 with the cathode off-gas exhaust passage 21 (three-way valve V2). On the other hand, the separated produced water is supplied to the water storage tank 60 through a produced water supply passage 24 that connects (communicates) the gas-liquid separator 30 with the water storage tank 60. Then, the separated produced water is stored in the water storage tank 60. Part of the separated produced water is supplied to the oxidant gas supply passage 20 through a circulation passage 25 that connects (communicates) the gas-liquid separator 30 with the oxidant gas supply passage 20. Then, the part of the separated produced water is used to humidify oxidant gas to be supplied to the fuel cell 10.

The fuel gas supply passage 40 is a duct that connects (communicates) a hydrogen tank (not shown) with the fuel cell 10. Fuel gas (hydrogen) supplied from the hydrogen tank is supplied to the fuel cell 10 through the fuel gas supply passage 40.

The anode off-gas exhaust passage 41 is a duct that connects (communicates) the fuel cell 10 with the gas-liquid separator 50. Anode off-gas emitted from the fuel cell 10 is supplied to the gas-liquid separator 50 through the anode off-gas exhaust passage 41.

The gas-liquid separator 50 separates fuel gas and produced water, included in anode off-gas supplied through the anode off-gas exhaust passage 41. The separated fuel gas is supplied to the fuel gas supply passage 40 through a circulation passage 43 that connects (communicates) the gas-liquid separator 50 with the fuel gas supply passage 40. Then, the separated fuel gas is supplied to the fuel cell 10 again. On the other hand, the separated produced water is supplied to the water storage tank 60 through a produced water supply passage 44 and the like in accordance with the open-closed state of the three-way valve V1. Then, the separated produced water is stored in the water storage tank 60. The produced water supply passage 44 connects (communicates) the gas-liquid separator 50 with the cathode off-gas exhaust passage 21.

The water storage tank 60 stores the produced water produced in the fuel cell 10. The water storage tank 60 is provided with a drain valve V3. The open-closed state of the drain valve V3 is controlled by the control unit 80. A large amount of produced water is mainly produced while the vehicle V is stopped, and is stored in the water storage tank 60. For example, about one liter of produced water can be stored in the water storage tank 60 when the vehicle is stopped for one or two hours (depending on the amount of electric power generated).

The drain passage 26 is a duct that connects (communicates) the water storage tank 60 (drain valve V3) with the cathode off-gas exhaust passage 21. The produced water stored in the water storage tank 60 is drained to outside the vehicle V via the exhaust port 22 through the drain passage 26 and the cathode off-gas exhaust passage 21 in accordance with the open-closed state of the drain valve V3.

The bypass passage 70 is a duct that connects (communicates) the oxidant gas supply passage 20 with the cathode off-gas exhaust passage 21. An open-close valve V4 is provided in the bypass passage 70. The open-closed state of the open-close valve V4 is controlled by the control unit 80. Oxidant gas (air or oxygen) supplied from the compressor (not shown) is supplied to the cathode off-gas exhaust passage 21 through the bypass passage 70 in accordance with the open-closed state of the open-close valve V4, and is further exhausted to outside the vehicle V via the exhaust port 22 through the cathode off-gas exhaust passage 21 in accordance with the open-closed state of each of the three-way valves V1, V2.

The humidity sensor 90 is a sensor that detects the humidity in the vehicle cabin S of the vehicle V and is electrically connected to the control unit 80. The humidity sensor 90 is, for example, provided in the vehicle cabin S of the vehicle V. The humidity detected by the humidity sensor 90 is input to the control unit 80.

The oxygen concentration sensor 91 is a sensor that detects an oxygen concentration in the vehicle cabin S of the vehicle V and is electrically connected to the control unit 80. The oxygen concentration sensor 91 is, for example, provided in the vehicle cabin S of the vehicle V. The oxygen concentration detected by the oxygen concentration sensor 91 is input to the control unit 80.

The cathode off-gas introducing passages 92 (92a, 92b, 92c) are ducts that introduce cathode off-gas exhausted through the cathode off-gas exhaust passage 21, into the vehicle cabin S of the vehicle V via introducing ports 93 (93a, 93b, 93c) for cathode off-gas, provided in the cathode off-gas exhaust passage 21. Open-close valves V5, V6, V7 are respectively provided in the cathode off-gas introducing passages 92. The open-closed state of each of the open-close valves V5, V6, V7 is controlled by the control unit 80.

Cathode off-gas exhausted through the cathode off-gas exhaust passage 21 is introduced into the vehicle cabin S of the vehicle V via the introducing ports 93 (93a, 93b, 93c) and the cathode off-gas introducing passages 92 (92a, 92b, 92c) in accordance with the open-closed state of each of the open-close valves V5, V6, V7.

At this time, it is possible to control (adjust) the amount (zero to full open) of cathode off-gas introduced into the vehicle cabin S of the vehicle V by controlling the open-closed state of each of the open-close valves V5, V6, V7. The cathode off-gas introducing passages 92 (92a, 92b, 92c) and the open-close valves V5, V6, V7 are examples of a cathode off-gas introducing unit according to the aspect of the disclosure. The introducing ports 93a, 93b, 93c for cathode off-gas are provided at locations at which distances from the fuel cell 10 (stack) are different from one another in the cathode off-gas exhaust passage 21 (see FIG. 1).

In FIG. 1, three sets of the cathode off-gas introducing passage 92 (introducing port 93) and the open-close valve (that is, the cathode off-gas introducing passages 92 (introducing ports 93) and the open-close valves V5, V6, V7) are provided; however, the configuration is not limited thereto. Two sets or four or more sets may be provided.

Figure 2:
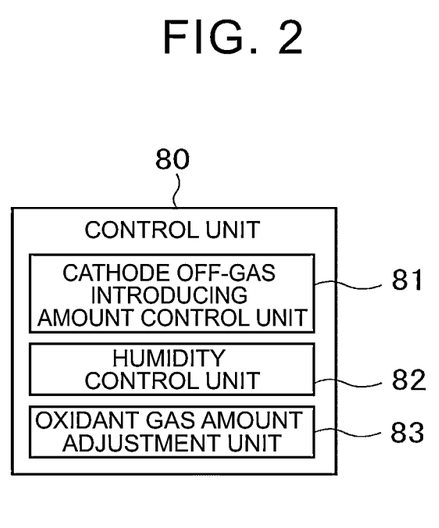
FIG. 2 is a functional block diagram of a control unit 80.

The control unit 80 includes a processor (not shown). The processor is, for example, a central processing unit (CPU). The number of processors may be one or may be multiple. The processor functions as a cathode off-gas introducing amount control unit 81, a humidity control unit 82, and an oxidant gas amount adjustment unit 83 as shown in FIG. 2 by running a predetermined program loaded from a non-volatile storage unit (not shown), such as a ROM, onto a RAM (not shown). FIG. 2 is a functional block diagram of the control unit 80. One or some or all of these units may be implemented by hardware.

The cathode off-gas introducing amount control unit 81 controls the amount (zero to full open) of cathode off-gas introduced into the vehicle cabin S of the vehicle V in accordance with the humidity in the vehicle cabin S of the vehicle V, detected by the humidity sensor 90. For example, the cathode off-gas introducing amount control unit 81 controls the amount of cathode off-gas introduced into the vehicle cabin S of the vehicle V by controlling the open-closed state of each of the open-close valves V5, V6, V7 such that the humidity in the vehicle cabin S of the vehicle V, detected by the humidity sensor 90, becomes a predetermined humidity (for example, a target humidity set by a user).

The humidity control unit 82 controls the humidity (or the temperature) of cathode off-gas introduced into the vehicle cabin S of the vehicle V in accordance with the humidity (or the temperature) in the vehicle cabin S of the vehicle V, detected by the humidity sensor 90. For example, the humidity control unit 82 controls (adjusts) the humidity of cathode off-gas introduced into the vehicle cabin S of the vehicle V by controlling the open-closed state of each of the open-close valves V5, V6, V7 to change the introducing port 93 (93a, 93b, 93c) for cathode off-gas.

In the cathode off-gas exhaust passage 21, cathode off-gas is higher in temperature and higher in humidity as it approaches the fuel cell 10 (stack). Therefore, cathode off-gas introduced via the introducing port 93c, cathode off-gas introduced via the introducing port 93b, and cathode off-gas introduced via the introducing port 93a are in descending order of temperature and descending order of humidity. Therefore, the humidity control unit 82 controls (adjusts) the humidity (and the temperature) of cathode off-gas introduced into the vehicle cabin S of the vehicle V by controlling the open-closed state of each of the open-close valves V5, V6, V7 to change the introducing port 93 (93a, 93b, 93c) for cathode off-gas.

The oxidant gas amount adjustment unit 83 adjusts the amount of oxidant gas to be flowed through the bypass passage 70 in accordance with the oxygen concentration in the vehicle cabin S of the vehicle V, detected by the oxygen concentration sensor 91. The bypass passage 70 connects the cathode off-gas exhaust passage 21 with the oxidant gas supply passage 20 through which oxidant gas is supplied to the fuel cell 10. For example, the oxidant gas amount adjustment unit 83 adjusts the amount of oxidant gas to be flowed through the bypass passage 70 by controlling the open-closed state of the open-close valve V4. Thus, the amount of oxidant gas to be introduced into the vehicle cabin S of the vehicle V through the bypass passage 70, the cathode off-gas exhaust passage 21, and the cathode off-gas introducing passages 92 (92a, 92B, 92c) is adjusted.

Figure 3:
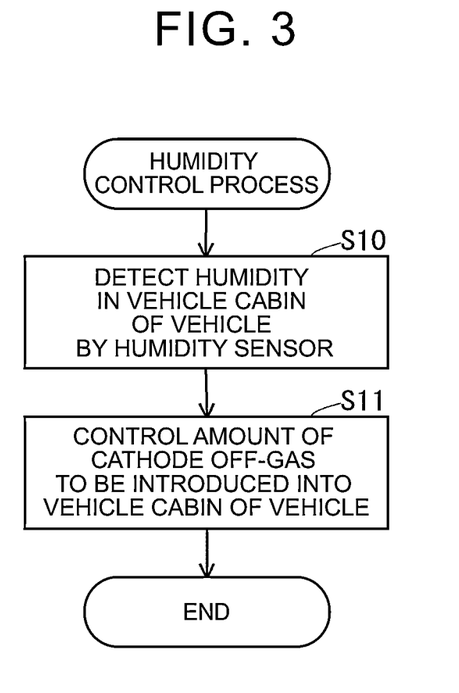
FIG. 3 is a flowchart of a first operation example of the fuel cell system 1.

Next, a first operation example of the thus configured fuel cell system 1 will be described.

FIG. 3 is a flowchart of the first operation example of the fuel cell system 1.

In the following description, it is assumed that oxidant gas is supplied to the fuel cell 10 through the oxidant gas supply passage 20, fuel gas is supplied to the fuel cell 10 through the fuel gas supply passage 40, and the fuel cell 10 is generating electric power. At this time, it is assumed that the open-close valves V5, V6 are closed, cathode off-gas exhausted from the fuel cell 10 is introduced into the vehicle cabin S of the vehicle V through the cathode off-gas exhaust passage 21, the introducing port 93c, the cathode off-gas introducing passage 92c, and the open-close valve V7.

Initially, the humidity in the vehicle cabin S of the vehicle V is detected by the humidity sensor 90 (step S10).

Subsequently, the amount of cathode off-gas introduced into the vehicle cabin S of the vehicle V is controlled (step S11). This is performed by the cathode off-gas introducing amount control unit 81. The cathode off-gas introducing amount control unit 81 controls the amount of cathode off-gas to be introduced into the vehicle cabin S of the vehicle V in accordance with the humidity in the vehicle cabin S of the vehicle V, detected in step S10. For example, the cathode off-gas introducing amount control unit 81 controls the amount of cathode off-gas to be introduced into the vehicle cabin S of the vehicle V by controlling the open-closed state of the open-close valve V7 such that the humidity in the vehicle cabin S of the vehicle V, detected in step S10, becomes a predetermined humidity (for example, a target humidity set by a user).

Thus, it is possible to optimize the humidity in the vehicle cabin S of the vehicle V. In the first operation example, not only cathode off-gas, the one vaporized from produced water stored in the water storage tank 60 may be introduced into the vehicle cabin S of the vehicle V.

Figure 4:
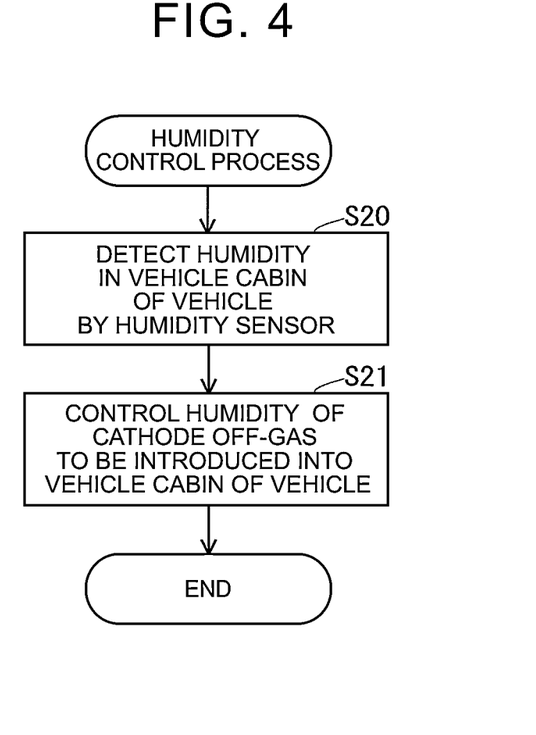
FIG. 4 is a flowchart of a second operation example of the fuel cell system 1.

Next, a second operation example of the thus configured fuel cell system 1 will be described.

FIG. 4 is a flowchart of the second operation example of the fuel cell system 1.

In the following description, it is assumed that oxidant gas is supplied to the fuel cell 10 through the oxidant gas supply passage 20, fuel gas is supplied to the fuel cell 10 through the fuel gas supply passage 40, and the fuel cell 10 is generating electric power. At this time, it is assumed that the open-close valves V5, V6, V7 are closed.

Initially, the humidity in the vehicle cabin S of the vehicle V is detected by the humidity sensor 90 (step S20).

Subsequently, the amount of cathode off-gas introduced into the vehicle cabin S of the vehicle V is controlled (step S21). This is performed by the humidity control unit 82. The humidity control unit 82 controls the humidity of cathode off-gas to be introduced into the vehicle cabin S of the vehicle V in accordance with the humidity in the vehicle cabin S of the vehicle V, detected in step S20. For example, the humidity control unit 82 controls (adjusts) the humidity of cathode off-gas introduced into the vehicle cabin S of the vehicle V by controlling the open-closed state of each of the open-close valves V5, V6, V7 to change the introducing port 93 (93a, 93b, 93c) for cathode off-gas such that the humidity becomes a predetermined humidity (for example, a target humidity set by a user).

Thus, it is possible to introduce cathode off-gas with an appropriate humidity into the vehicle cabin S of the vehicle V. In the second operation example as well, not only cathode off-gas, the one vaporized from produced water stored in the water storage tank 60 may be introduced into the vehicle cabin S of the vehicle V.

Figure 5:
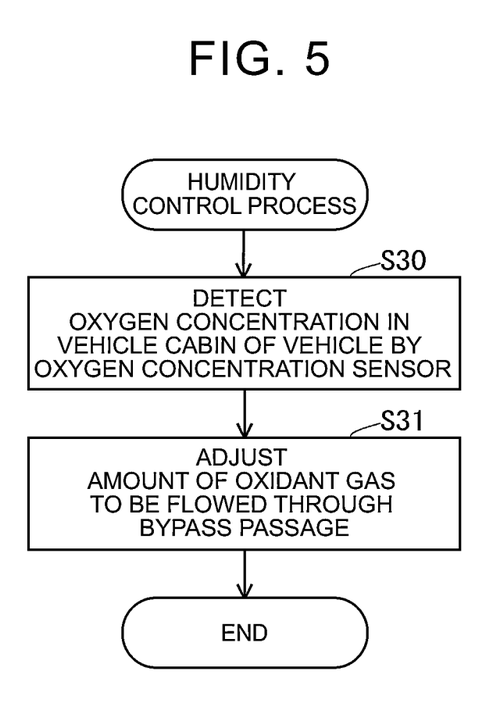
FIG. 5 is a flowchart of a third operation example of the fuel cell system 1.

Next, a third operation example of the thus configured fuel cell system 1 will be described.

FIG. 5 is a flowchart of the third operation example of the fuel cell system 1.

In the following description, it is assumed that the process of FIG. 3 or the process of FIG. 4 is being executed.

Initially, the oxygen concentration in the vehicle cabin S of the vehicle V is detected by the oxygen concentration sensor 91 (step S30).

Subsequently, the amount of oxidant gas to be flowed through the bypass passage 70 is adjusted (step S31). This is performed by the oxidant gas amount adjustment unit 83. The oxidant gas amount adjustment unit 83 adjusts the oxidant gas amount to be flowed through the bypass passage 70 in accordance with the oxygen concentration in the vehicle cabin S of the vehicle V, detected in step S30. The bypass passage 70 connects the cathode off-gas exhaust passage 21 with the oxidant gas supply passage 20 through which oxidant gas is supplied to the fuel cell 10. For example, when the oxygen concentration detected in step S30 is lower than a predetermined oxygen concentration, the oxidant gas amount adjustment unit 83 increases the amount of oxidant gas to be flowed through the bypass passage 70 by controlling the open-closed state of the open-close valve V4. Thus, the amount of oxidant gas to be introduced into the vehicle cabin S of the vehicle V through the bypass passage 70, the cathode off-gas exhaust passage 21, the cathode off-gas introducing passages 92 (92a, 92b, 92c), and the open-close valves V5, V6, V7 (the amount of oxidant gas with a high oxygen concentration) increases.

Thus, the oxygen concentration in the vehicle cabin S of the vehicle V is able to be set to an appropriate oxygen concentration.

Figure 6:
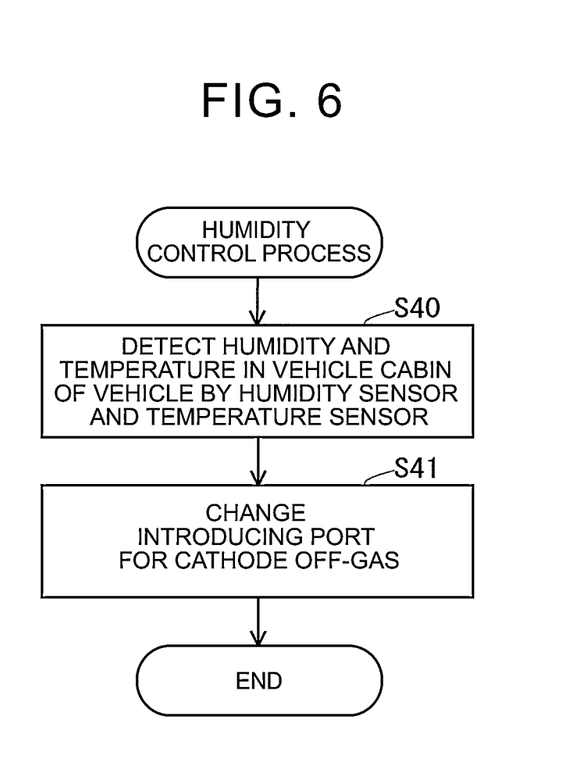
FIG. 6 is a flowchart of a fourth operation example of the fuel cell system 1.

Next, a fourth operation example of the thus configured fuel cell system 1 will be described.

FIG. 6 is a flowchart of the fourth operation example of the fuel cell system 1.

In the following description, it is assumed that the process of FIG. 3 or the process of FIG. 4 is being executed.

Initially, the humidity in the vehicle cabin S of the vehicle V is detected by the humidity sensor 90 and the temperature in the vehicle cabin S of the vehicle is detected by the temperature sensor 95 (step S40).

Subsequently, the introducing port for cathode off-gas is changed (step S41). This is performed by the humidity control unit 82. The humidity control unit 82 changes the introducing port 93 (93a, 93b, 93c) for cathode off-gas based on the condition of the humidity or the temperature in the vehicle cabin S of the vehicle V. For example, the humidity control unit 82 changes the introducing port 93 (93a, 93b, 93c) for cathode off-gas by controlling the open-closed state of each of the open-close valves V5, V6, V7 such that cathode off-gas that satisfies a predetermined condition of the humidity or the temperature in the vehicle cabin S of the vehicle V (for example, the condition of the humidity or the temperature in the vehicle cabin S of the vehicle V, set by a user) is introduced into the vehicle cabin S of the vehicle V.

Thus, it is possible to introduce cathode off-gas with an appropriate humidity and an appropriate temperature into the vehicle cabin S of the vehicle V.

As described above, according to the embodiment, it is possible to control the humidity in the vehicle cabin S of the vehicle V on which the fuel cell 10 is mounted.

This is because the cathode off-gas introducing amount control unit 81 that controls the amount of cathode off-gas introduced into the vehicle cabin S of the vehicle V in accordance with the humidity in the vehicle cabin S of the vehicle V, detected by the humidity sensor 90, is provided.

In the above embodiment, a program includes a command set (or software code) for causing a computer to execute one or more functions described in the embodiment when the program is loaded onto the computer. The program may be stored in a non-transitory computer-readable medium or tangible storage medium. Nonrestrictive examples of the computer-readable medium or tangible storage medium include memory technologies, such as a random-access memory (RAM), a read-only memory (ROM), a flash memory, a solid-state drive (SSD), and others, optical disk storages, such as a CD-ROM, a digital versatile disc (DVD), a Blu-ray (registered trademark) disc, and others, and magnetic storage devices, such as a magnetic cassette, a magnetic tape, a magnetic disk storage, and others. The program may be transmitted on a transitory computer-readable medium or communication medium. Nonrestrictive examples of the temporary computer-readable medium or communication medium include an electrical, optical, acoustic, or other-type propagation signals.

All the numeric values described in the above embodiment are illustrative and, of course, appropriate numeric values different from those numeric values may be used.

The above embodiment is only illustrative in all respects. The disclosure should not be interpreted restrictively to the above embodiment. The disclosure may be implemented in other various forms without departing from the spirit or main features thereof.

What is claimed is:

1. A fuel cell system that is mounted on a vehicle, the fuel cell system comprising:
   a fuel cell;
   a humidity sensor configured to detect a humidity in a vehicle cabin of the vehicle;
   a cathode off-gas exhaust passage through which cathode off-gas emitted from the fuel cell is exhausted to outside the vehicle;
   a plurality of introducing ports for cathode off-gas, provided in the cathode off-gas exhaust passage;
   a cathode off-gas introducing unit configured to introduce the cathode off-gas emitted from the fuel cell, from the plurality of introducing ports into the vehicle cabin of the vehicle, the cathode off-gas introducing unit comprising:
      a plurality of cathode off-gas introducing passages correspondingly connected to the plurality of introducing ports, and a plurality of open-close valves correspondingly in the plurality of cathode off-gas introducing passages; and a control unit configured to control an amount of the cathode off-gas introduced into the vehicle cabin of the vehicle in accordance with the humidity in the vehicle cabin of the vehicle, detected by the humidity sensor, and control an open-close state of each of the plurality of open-close valves corresponding to the plurality of introducing ports to adjust a humidity of the cathode off-gas introduced into the vehicle cabin of the vehicle.

2. The fuel cell system according to claim 1, further comprising:

an oxygen concentration sensor configured to detect an oxygen concentration in the vehicle cabin of the vehicle;

an oxidant gas supply passage through which oxidant gas is supplied to the fuel cell; and a bypass passage that connects the cathode off-gas exhaust passage with the oxidant gas supply passage, wherein the control unit is further configured to, in accordance with the oxygen concentration in the vehicle cabin of the vehicle, detected by the oxygen concentration sensor, adjust an amount of oxidant gas to be flowed through the bypass passage.

3. The fuel cell system according to claim 1, wherein:

the control unit is configured to, based on a condition of a humidity or a temperature in the vehicle cabin of the vehicle, change, among the plurality of introducing ports, the introducing port through which the cathode off-gas is introduced into the vehicle cabin.

4. The fuel cell system according to claim 1, wherein the plurality of introducing ports is provided, in the cathode off-gas exhaust passage, at locations which are at different distances from the fuel cell.

5. The fuel cell system according to claim 1, wherein the plurality of introducing ports comprises first through third introducing ports, the cathode off-gas introduced via the first introducing port, the cathode off-gas introduced via the second introducing port, and the cathode off-gas introduced via the third introducing port are in descending order of temperature and descending order of humidity, and the control unit is configured to adjust the humidity and a temperature of the cathode off-gas introduced into the vehicle cabin, by controlling the open-closed state of each of the open-close valves corresponding to the first through third introducing ports to change the introducing port through which the cathode off-gas is introduced into the vehicle cabin.

6. The fuel cell system according to claim 5, wherein among the first through third introducing ports and along the cathode off-gas exhaust passage, the first introducing port is closest to the fuel cell, the third introducing port is farthest from the fuel cell, and the second introducing port is between the first introducing port and the third introducing port.

* * * * *